United States Patent
Tabet et al.

(10) Patent No.: US 9,363,704 B2
(45) Date of Patent: Jun. 7, 2016

(54) SELECTING A PHYSICAL DATA CHANNEL BASED ON APPLICATION TRAFFIC PATTERN

(71) Applicant: Apple Inc., Cupertino, CA (US)

(72) Inventors: Tarik Tabet, Los Gatos, CA (US); Farouk Belghoul, Campbell, CA (US); S. Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/310,970

(22) Filed: Jun. 20, 2014

(65) Prior Publication Data
US 2015/0373689 A1 Dec. 24, 2015

(51) Int. Cl.
*H04W 72/04* (2009.01)
*H04W 28/02* (2009.01)
*H04L 1/00* (2006.01)
*H04W 72/08* (2009.01)
*H04W 76/02* (2009.01)

(52) U.S. Cl.
CPC ............. *H04W 28/0263* (2013.01); *H04L 1/00* (2013.01); *H04W 72/087* (2013.01); *H04W 76/02* (2013.01)

(58) Field of Classification Search
CPC .. H04L 1/00; H04W 28/0263; H04W 72/087; H04W 76/02
See application file for complete search history.

(56) References Cited

U.S. PATENT DOCUMENTS

| 6,166,667 | A | 12/2000 | Park |
| 6,865,710 | B2 | 3/2005 | Bickerstaff et al. |
| 2002/0093922 | A1* | 7/2002 | Grilli .................... H04B 7/2675 370/328 |
| 2008/0301536 | A1* | 12/2008 | Shin ....................... H04L 1/0043 714/786 |
| 2009/0015448 | A1* | 1/2009 | Kutz ................. H03M 13/2957 341/81 |
| 2010/0208603 | A1* | 8/2010 | Ishii ..................... H04B 1/7113 370/252 |
| 2013/0188589 | A1* | 7/2013 | Nakashima .......... H04B 7/0404 370/329 |
| 2014/0064240 | A1 | 3/2014 | Dinan |
| 2014/0342746 | A1* | 11/2014 | Nakashima ........... H04L 5/0048 455/450 |

* cited by examiner

Primary Examiner — Kenneth Lam
(74) Attorney, Agent, or Firm — Meyertons Hood Kivlin Kowert & Goetzel, P.C.; Jeffrey C. Hood

(57) ABSTRACT

Selecting a physical channel for cellular communication based on application traffic pattern. A radio bearer may be established between a wireless device and a base station. A physical downlink channel may be selected for the radio bearer. The physical downlink channel may be selected based on an application traffic pattern of an application associated with the radio bearer. In some instances, a physical uplink channel may also be selected based on an application traffic pattern of an application associated with the radio bearer.

12 Claims, 11 Drawing Sheets

SELECTING A PHYSICAL DATA CHANNEL BASED ON APPLICATION TRAFFIC PATTERN

FIELD

The present application relates to wireless devices, and more particularly to a system and method for selecting physical channels for data communications in a cellular communication system based on application traffic patterns.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of, inter alia, methods for selecting physical channels for data communications in a cellular communication system based on application traffic patterns, and of devices configured to implement the methods.

According to the techniques described herein, multiple physical channels may be provided for unicast data communication in a cellular system. The multiple physical channels may include both multiple physical uplink channels and multiple physical downlink channels. The different channels may have different characteristics such that each may be particularly well suited for use with a particular type (or multiple types) of application traffic pattern. For example, one physical channel might be better suited to periodic and/or low data rate application traffic patterns, while another physical channel might be better suited to aperiodic and/or high data rate application traffic patterns.

Given the availability of multiple physical channels for data communication, when establishing a data radio bearer between a wireless device and a base station, an application traffic pattern of an application associated with the data radio bearer may be considered as part of selecting which physical uplink and/or downlink channel the data radio bearer utilizes.

This may allow wireless devices and cellular networks to communicate application data using the physical channel whose characteristics are best suited to the application traffic pattern of the application data being communicated. This may in turn improve overall system resource usage and/or device battery consumption characteristics.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
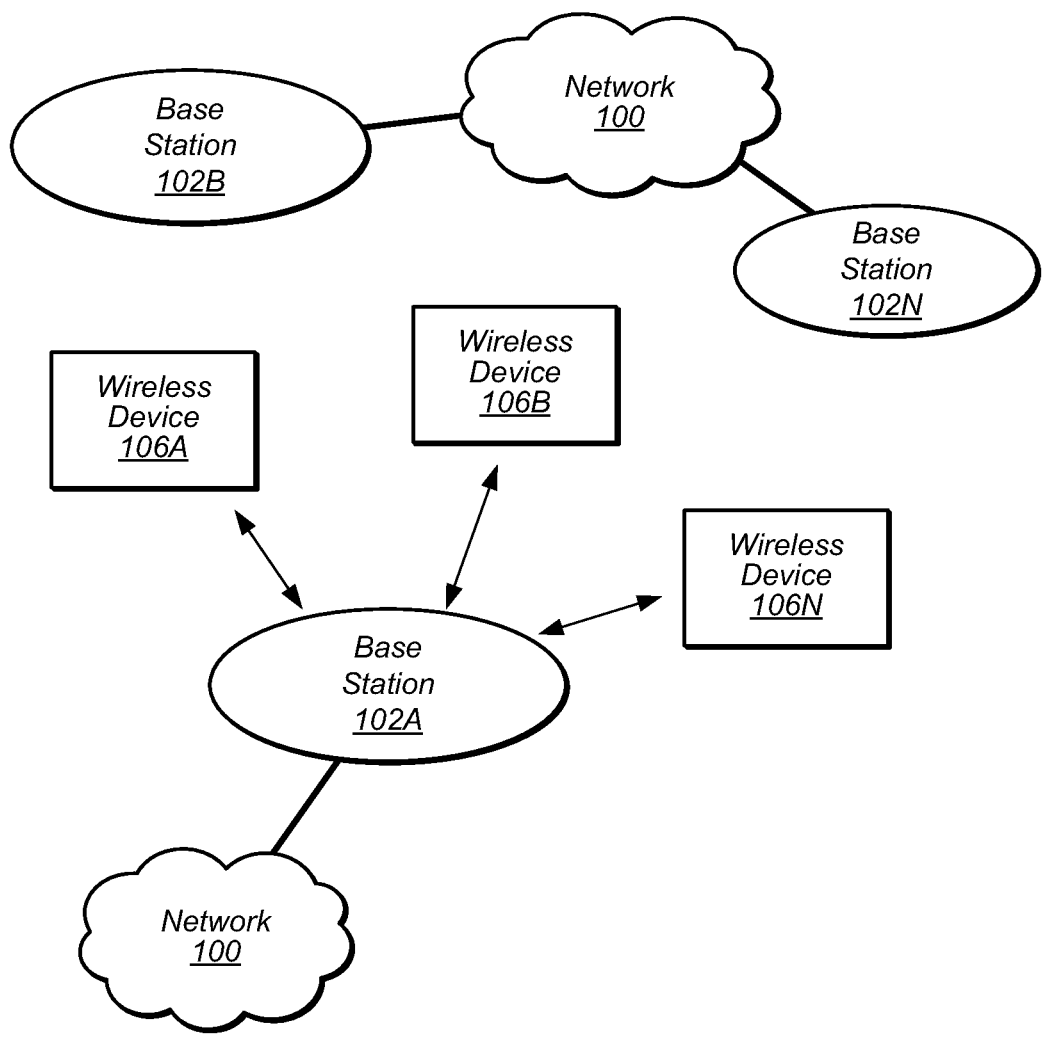
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

Detailed Description

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
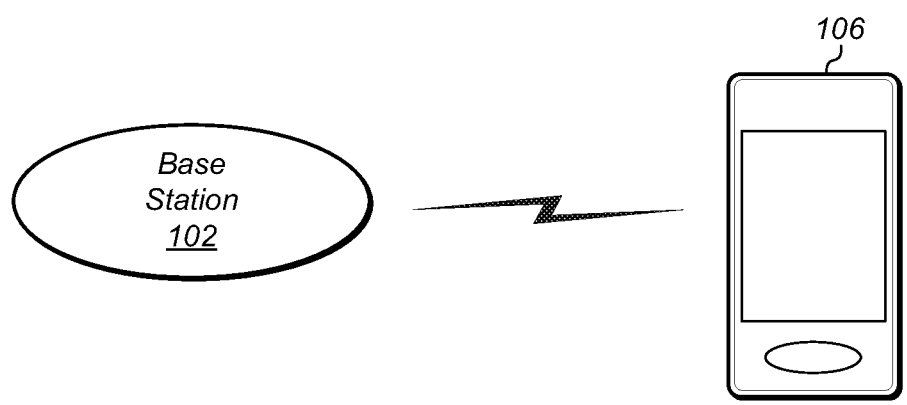
FIG. 2 illustrates a base station ("BS", or "eNodeB" or "eNB" in an LTE context) in communication with a wireless device.
Figure 3:
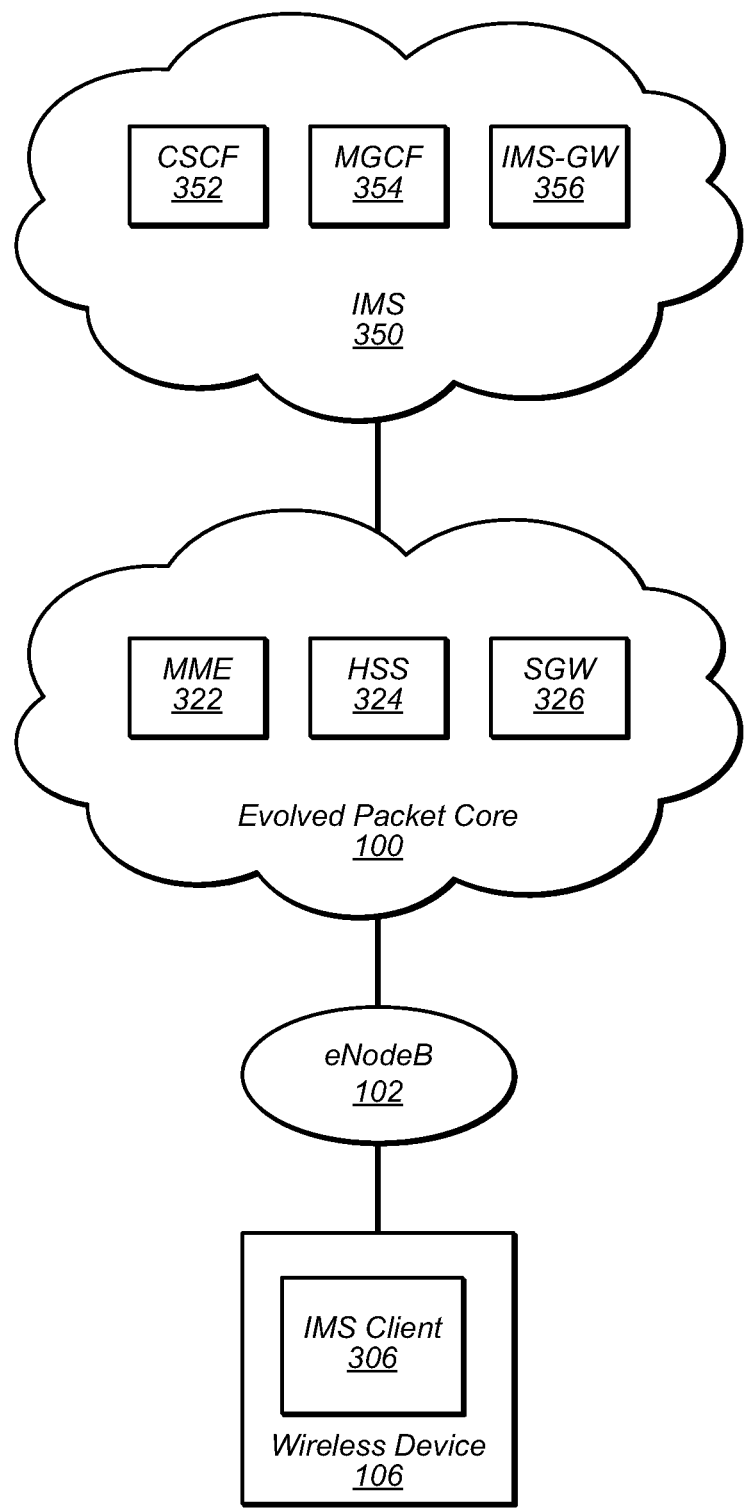
FIG. 3 illustrates an exemplary wireless communication system which may be used for voice over IP embodiments.

FIGS. 1-3—Communication System

FIG. 1 illustrates an exemplary (and simplified) wireless communication system. It is noted that the system of FIG. 1 is merely one example of a possible system, and that features of the present disclosure may be implemented in any of various systems, as desired.

As shown, the exemplary wireless communication system includes a base station 102A which communicates over a transmission medium with one or more wireless devices 106A, 106B, etc., through 106N. Some or all of the wireless devices may be user devices, which may be referred to herein as "user equipment" (UE) or UE devices.

The base station 102A may be a base transceiver station (BTS) or cell site, and may include hardware that enables wireless communication with the wireless devices 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B ... 102N) operating according to the same or a different cellular communication technology may thus be provided as a network of cells, which may provide continuous or nearly continuous overlapping service to wireless devices 106A-N and similar devices over a wide geographic area via one or more cellular communication technologies.

Thus, while base station 102A may provide a "serving cell" for wireless devices 106A-N as illustrated in FIG. 1, each wireless device 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that at least in some instances a wireless device 106 may be capable of communicating using multiple wireless communication technologies. For example, a wireless device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a wireless device 106 (e.g., a specialized wireless device) may be configured to communicate using only a single wireless communication technology.

FIG. 2 illustrates wireless device 106 (e.g., one of the devices 106A through 106N) in communication with a base station 102 (e.g., one of the base stations 102A through 102N). The wireless device 106 may be a UE device with cellular communication capability such as a mobile phone, a hand-held device, a computer or a tablet, or virtually any type of wireless device.

The wireless device 106 may include a processor that is configured to execute program instructions stored in memory. The wireless device 106 may perform any of the method embodiments described herein by executing such stored instructions. Alternatively, or in addition, the wireless device 106 may include a programmable hardware element such as an FPGA (field-programmable gate array) that is configured to perform any of the method embodiments described herein, or any portion of any of the method embodiments described herein.

In some embodiments, the wireless device 106 may be configured to communicate using any of multiple radio access technologies/wireless communication protocols. For example, the wireless device 106 may be configured to communicate using two or more of GSM, UMTS, CDMA2000, LTE, LTE-A, WLAN/Wi-Fi, or GNSS. Other combinations of wireless communication technologies are also possible.

The wireless device 106 may include one or more antennas for communicating using one or more wireless communication protocols or technologies. In one embodiment, the wireless device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 106 may share one or more parts of a receive and/or transmit chain between multiple wireless communication technologies, such as those discussed above.

In some embodiments, the wireless device 106 may include separate transmit and/or receive chains (e.g., including separate RF and/or digital radio components) for each wireless communication technology with which it is configured to communicate. As a further possibility, the wireless device 106 may include one or more radios which are shared between multiple wireless communication technologies, and one or more radios which are used exclusively by a single wireless communication technology. For example, the wireless device 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice over IP communication, such as voice over LTE (VoLTE) in an LTE network. Note that, as used herein, the term "VoLTE" may include voice services over present and/or future versions of LTE, for example including LTE-A.

As shown, the wireless device 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The wireless device 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. The IMS 350 may include various other devices known to those skilled in the art as well.

Thus, the system of FIG. 3 illustrates an exemplary portion of a data pathway which may be used for voice over IP communication, e.g., VoLTE.

Figure 4:
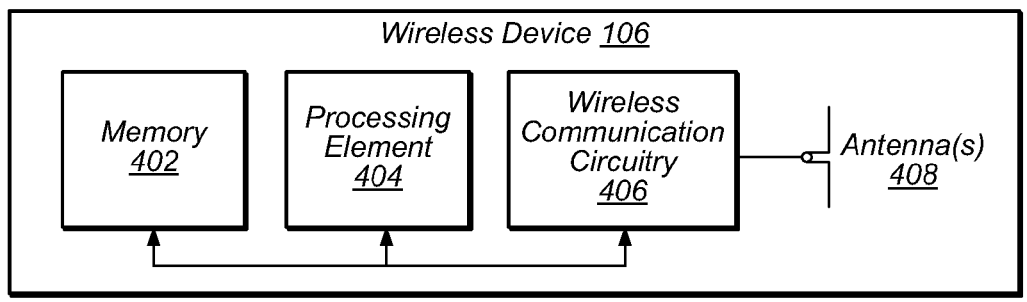
FIG. 4 illustrates an exemplary block diagram of a wireless device.

FIG. 4—Exemplary Block Diagram of a Wireless Device

FIG. 4 illustrates an exemplary block diagram of a wireless device 106 which may be configured for use in conjunction with various aspects of the present disclosure. The device 106 may be any of a variety of types of device and may be configured to perform any of a variety of types of functionality. For example, the device 106 may be a substantially portable device (a mobile device), such as a mobile phone, a personal productivity device, a computer or a tablet, a handheld gaming console, a portable media player, etc. Alternatively, the device 106 may be a substantially stationary device, such as a weather station, a process control element, a measurement device, a television, a subwoofer, speaker, or other audio rendering device, a set-top box, etc., if desired.

As shown, the device 106 may include a processing element 404. The processing element 404 may include or be coupled to one or more local and/or system memory elements, such as memory 402. Memory 402 may include any of a variety of types of memory and may serve any of a variety of functions. For example, memory 402 could be RAM serving as a system memory for processing element 404. Other types and functions are also possible.

The device 106 may also include wireless communication circuitry 406. The wireless communication circuitry 406 may include analog and/or digital circuitry components, and include one or more radios. In general, a radio may include any combination of a baseband processor, analog RF signal processing circuitry (e.g., including filters, mixers, oscillators, amplifiers, etc.), or digital processing circuitry (e.g., for digital modulation as well as other digital processing). A radio may implement one or more receive and transmit chains using the aforementioned hardware. In some instances, the wireless device 300 may share one or more parts of a receive and/or transmit chain between multiple wireless communication technologies, such as those discussed herein above. The wireless communication circuitry may be coupled to one or more antennas 408.

Note that if desired, the wireless communication circuitry 406 may include an on-board processing element in addition to processing element 404; for example, processing element 404 may be an 'application processor' while wireless communication circuitry 406 may include its own 'baseband processor'; alternatively (or in addition), processing element 404 may provide processing capability for the wireless communication circuitry 406. The device 106 may be capable of communicating using any of various wireless communication technologies by way of wireless communication circuitry 406 and antenna(s) 408.

The device 106 may additionally include any of a variety of other components (not shown) for implementing device functionality, depending on the intended functionality of the device 106, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 106, such as processing element 404, memory 402, wireless communication circuitry 406, and antenna(s) 408, may be operatively coupled via one or more intra-chip and/or inter-chip interconnection interfaces, which may include any of a variety of types of interface, possibly including a combination of multiple types of interface. As one example, a USB high-speed inter-chip (HSIC) interface may be provided for inter-chip communications between processing element 404 and wireless communication circuitry 406. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 404, memory 402, wireless communication circuitry 406, and/or any of various other device components. Other types of interfaces (e.g., peripheral interfaces for communication with peripheral components within or external to device 106, etc.) may also be provided as part of device 106.

Figure 7:
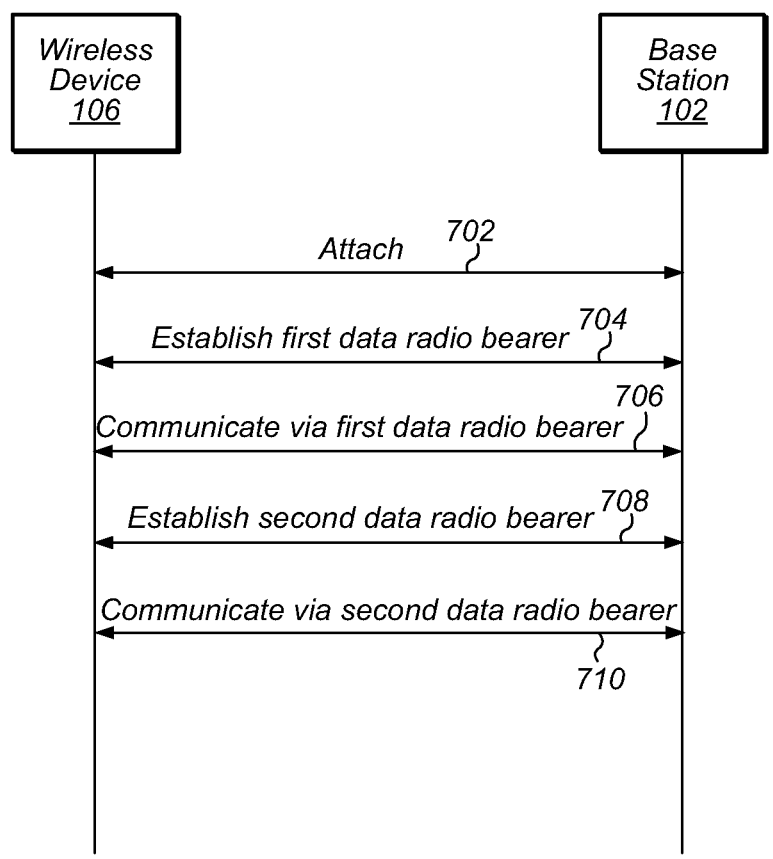
FIG. 7 is a communication flow diagram illustrating an exemplary method for selecting a physical data channel in a cellular communication system.

As described herein, the device 106 may include hardware and software components for implementing features for selecting physical data channels for cellular communication based on application traffic patterns, such as those described herein with reference to, inter alia, FIG. 7.

Figure 5:
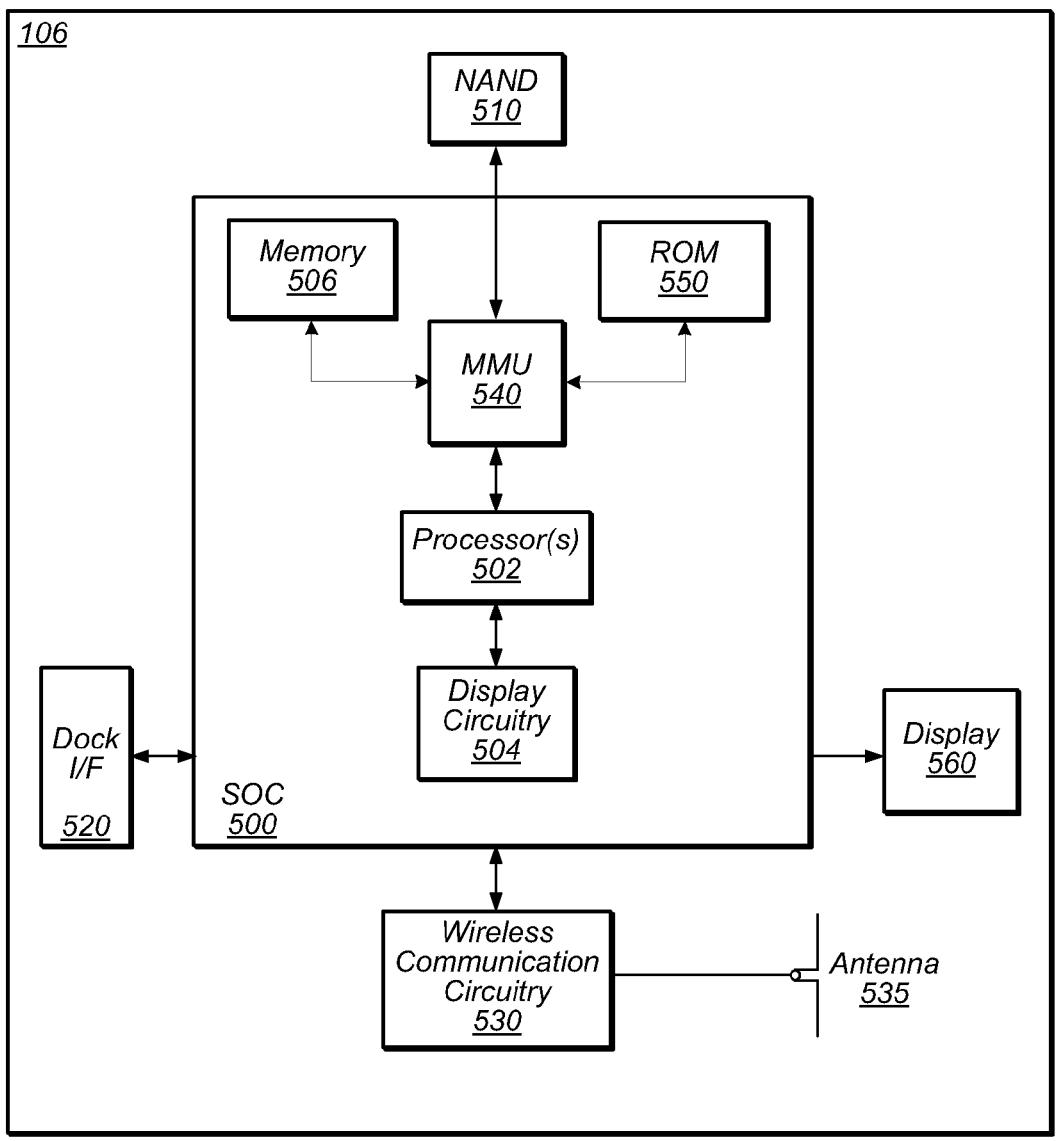
FIG. 5 illustrates an exemplary block diagram of a UE type wireless device.

FIG. 5—Exemplary Block Diagram of a UE

FIG. 5 illustrates an exemplary block diagram of a UE type wireless device 106. As shown, the UE 106 may include a system on chip (SOC) 500, which may include portions for various purposes. For example, as shown, the SOC 500 may include processor(s) 502 which may execute program instructions for the UE 106 and display circuitry 504 which may perform graphics processing and provide display signals to the display 560. The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, wireless communication circuitry 530 (e.g., including one or more radios), connector I/F 520, and/or display 560. The MMU 540 may be configured to perform memory protection and page table translation or set up. In some embodiments, the MMU 540 may be included as a portion of the processor(s) 502.

As also shown, the SOC 500 may be coupled to various other circuits of the UE 106. For example, the UE 106 may include various types of memory (e.g., including NAND flash 510), a connector interface 520 (e.g., for coupling to a computer system, dock, charging station, etc.), the display 560, and wireless communication circuitry 530 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry 530 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 535 to perform the wireless communication.

The UE 106 may also include and/or be configured for use with one or more user interface elements. The user interface elements may include any of various elements, such as display 560 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 106 may include hardware and software components for implementing features for selecting physical data channels for cellular communication based on application traffic patterns, such as those described herein with respect to, inter alia, FIG. 7. The processor 502 of the UE device 106 may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE device 106, in conjunction with one or more of the other components 500, 504, 506, 510, 520, 530, 535, 540, 550, 560 may be configured to implement part or all of the features described herein.

Figure 6:
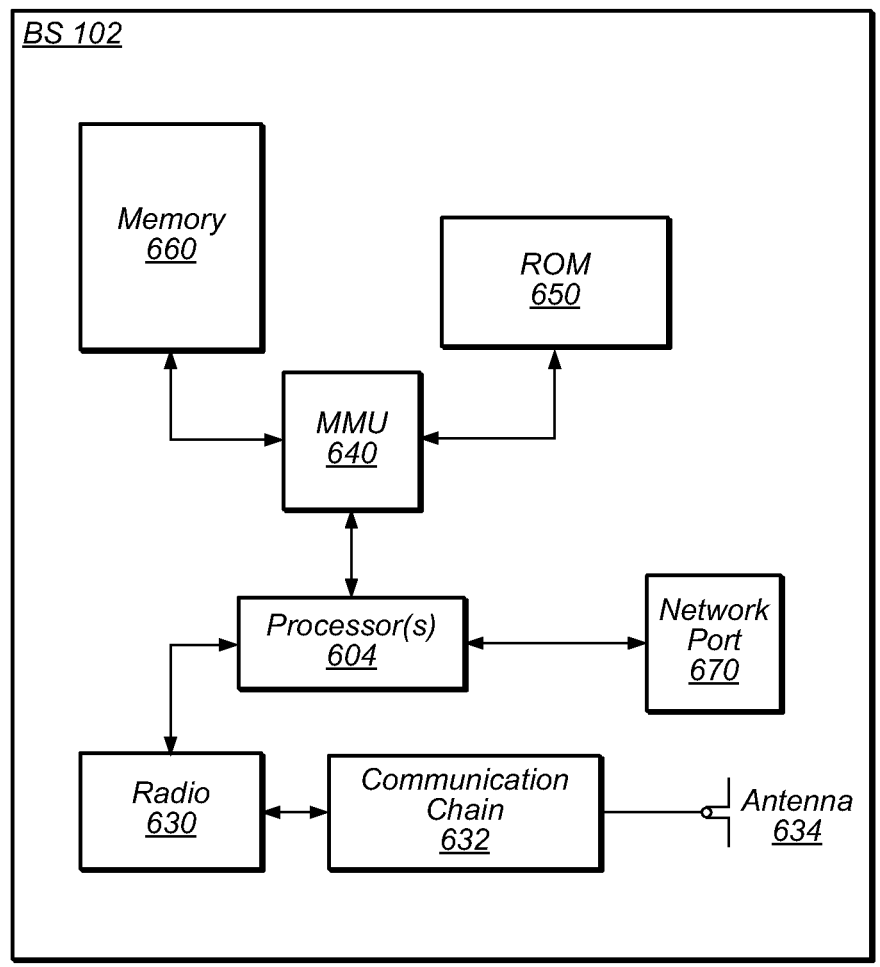
FIG. 6 illustrates an exemplary block diagram of a BS.

FIG. 6—Base Station

FIG. 6 illustrates an exemplary block diagram of a base station 102. It is noted that the base station of FIG. 6 is merely one example of a possible base station. As shown, the base station 102 may include processor(s) 604 which may execute program instructions for the base station 102. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The base station 102 may include at least one network port 670. The network port 670 may be configured to couple to a telephone network and provide a plurality of devices, such as wireless devices 106, access to the telephone network as described above.

The network port 670 (or an additional network port) may also or alternatively be configured to couple to a cellular network, e.g., a core network of a cellular service provider. The core network may provide mobility related services and/or other services to a plurality of devices, such as wireless devices 106. In some cases, the network port 670 may couple to a telephone network via the core network, and/or the core network may provide a telephone network (e.g., among other wireless devices serviced by the cellular service provider).

The base station 102 may include at least one antenna 634. The at least one antenna 634 may be configured to operate as a wireless transceiver and may be further configured to communicate with wireless devices 106 via radio 630. The antenna 634 communicates with the radio 630 via communication chain 632. Communication chain 632 may be a receive chain, a transmit chain or both. The radio 630 may be configured to communicate via various wireless communication technologies, including, but not limited to, LTE, GSM, WCDMA, CDMA2000, etc.

The processor(s) 604 of the base station 102 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

FIG. 7—Communication Flow Diagram

In many cellular communication systems, one physical uplink channel and one physical downlink channel are defined and used for unicast data communication. For example, currently, in LTE, downlink unicast data communication is performed using the physical downlink shared channel (PDSCH), while uplink data communication is performed using the physical uplink shared channel (PUSCH).

Increasingly, cellular communication systems are used to support multiple applications with multiple traffic patterns. With a single physical channel, the characteristics of that physical channel may not be optimal for all possible traffic patterns. If multiple physical channels with different characteristics suited to different application traffic patterns are provided, however, communication system resource use and power consumption profiles of devices in the communication system may be improved.

Accordingly, FIG. 7 is a communication flow diagram illustrating a method for selecting uplink and/or downlink physical channel for data communication between a base station and a wireless device from multiple possible physical channels at least partially on the basis of application traffic pattern.

The method of FIG. 7 may be used in conjunction with any of the computer systems or devices shown in the above Figures, among other devices. As one possibility, the method may be performed between a wireless device 106 and a base station 102. Note that the scheme shown in FIG. 7 may be used in conjunction with LTE systems as one possibility, or in conjunction with any of various other cellular systems, as desired.

Note that in various embodiments, some of the elements of the method shown may be performed concurrently, in a different order than shown, or may be omitted. Additional elements may also be performed as desired. As shown, the method may operate as follows.

In 702, the wireless device may attach to a cell provided by the base station. Attaching to the cell may include acquiring system information (e.g., which the base station may broadcast in a system information block) and registering with the base station. The wireless device may initially operate in an "idle mode" upon attaching to the cell. In the idle mode, the wireless device may periodically monitor the cell for paging information directed to the wireless device at scheduled intervals, and enter a low power state (e.g., by powering down some or all radio components) or "sleep" between such scheduled intervals. The wireless device may attach to the cell (and generally communicate with the base station providing the cell) according to any of various RATs, and the manner in which the wireless device attaches to the cell may vary depending on according to which RAT the wireless device and the base station communicate. As one specific possibility, the wireless device and the base station may communicate according to LTE.

In 704, the wireless device and the base station may establish a first data radio bearer. If the wireless device has application data to transmit or receive, the wireless device may first transition from the "idle mode" to a "connected mode". This may include establishing a (e.g., packet switched) data radio bearer on which the application data may be communicated. The transition from idle to connected mode may be initiated by the wireless device (e.g., by way of a random access procedure or RACH) or by the base station (e.g., by paging the wireless device).

Establishing the first data radio bearer may include selecting a physical uplink channel and a physical downlink channel which the first data radio bearer will use. In various scenarios, it may be possible that there may be multiple possible physical uplink channels and/or multiple possible physical downlink channels to select from. Each of the physical uplink channels and/or physical downlink channels may have different characteristics.

For example, a first physical downlink channel may be configured with characteristics selected as preferable for application data having a first application traffic pattern, such as low data rate (e.g., data rate below a data rate threshold) and/or periodic application traffic, while a second physical downlink channel may be configured with characteristics selected as preferable for application data having a second application traffic pattern, such as high data rate (e.g., data rate above the data rate threshold) and/or aperiodic application traffic.

Similarly, a first physical uplink channel may be configured with characteristics selected as preferable for application data having the first application traffic pattern, while a second physical uplink channel may be configured with characteristics selected as preferable for application data having the second application traffic pattern. Alternatively, uplink physical channel characteristics may differ from downlink physical channel characteristics, if desired, such that application traffic patterns used for selection of an uplink physical channel may differ from those used for selection of a downlink physical channel. As a further possibility, it may be the case that multiple possible physical channels are provided only for downlink data communication (e.g., if only a single uplink physical channel for data communication is provided), or only for uplink data communication (e.g., if only a single downlink physical channel for data communication is provided).

As one example of a possible characteristic which might differ between physical channels, a first physical (downlink or uplink) channel might utilize convolutional coding, while a second physical (downlink or uplink) channel might utilize turbo coding. In such a case, the channel with convolutional coding may be more suitable for low data rate application traffic, for which simplifying implementation and/or reducing power consumption may be a greater priority than maximizing bandwidth efficiency, while the channel with turbo coding may be more suitable for high data rate application traffic, for which maximizing bandwidth efficiency may be a greater priority than reducing power consumption, and for which the structure of the interleaver may bring greater benefits for long packets.

As another example of a possible characteristic which might differ between physical channels, a first physical (downlink or uplink) channel might not utilize hybrid automatic repeat requests (HARQ), while a second physical (downlink or uplink) channel might utilize HARQ. In such a case, the channel without HARQ may be more suitable for periodic/predictable application traffic and/or application traffic with relatively low packet loss tolerance, such as voice applications and/or applications for which the BLER needs to be as low as possible (e.g., 1% BLER), for which HARQ may not be necessary and/or for which alternate features (e.g., introducing a fixed pattern of repetitions or utilizing TTI bundling that do not require ACK/NACK feedback) may be used to ensure acceptable quality of service which may be specific to periodic application traffic patterns. The channel with HARQ, in contrast, may be more suitable for aperiodic/unpredictable application traffic and/or application traffic with relatively high packet loss tolerance and that support RLC retransmissions.

Accordingly, at least in some instances, selection of a physical uplink channel and/or a physical downlink channel for the first data radio bearer may be based at least in part on an application traffic pattern of an application ("first application") associated with the first data radio bearer. The first application may be associated with the first data radio bearer, as one example, if the data radio bearer is or will be used to communicate application data of the first application.

The first application may be an application of any of various application types, including but not limited to a voice application, a video application, an email application, a gaming application, a web browser application, an intelligent personal assistant application, a mapping application, a measurement/data collection application, a process control application, and/or any of various other types of application.

The application traffic pattern of the first application (or any other application) may be defined based on any of various characteristics of application traffic of the first application. Periodicity/predictability of application traffic may be one such characteristic. Average data rate and/or variability of data rate may be additional or alternative such characteristics. Any number of other additional or alternative characteristics are also possible.

For example, as one possibility, a first application traffic pattern might be defined as application traffic which is consistently periodic and below a data rate threshold. A second application traffic pattern might be defined as application traffic which is consistently periodic and above the data rate threshold. A third application traffic pattern might be defined as application traffic which is not consistently periodic. As another possibility, the exemplary "second" and "third" application traffic pattern might be considered together as a category of application traffic which is either or both of not consistently periodic or above the data rate threshold. Any number of other possible application traffic patterns may be defined, as desired.

Thus, in some instances certain application traffic patterns may be associated with certain physical channels, such that a particular physical channel associated with the application traffic pattern of a given application may be selected when establishing a data radio bearer associated with that application. For example, a first physical downlink and/or uplink channel may be selected for radio bearers associated with applications having a first application traffic pattern, while a second physical downlink and/or uplink channel may be selected for radio bearers associated with applications having a second application traffic pattern.

As a specific example, consider an LTE communication system. In such a system, radio bearers may be assigned a Quality of Service (QoS) Class Identifier (QCI), which may provide an indication of a packet error loss rate and delay budget which may be tolerable for an application utilizing that radio bearer. For example, radio bearers with QCI 1 may be reserved for voice applications such as VoLTE. Thus, as one possibility, any QCI 1 radio bearer may be mapped to a (e.g., newly defined in LTE) physical uplink and/or downlink data channel with characteristics suitable for voice traffic.

Once the first radio bearer has been established using the selected physical uplink and downlink channels, in 706, the wireless device and the base station may communicate (e.g., each may transmit and/or receive) application data associated with the first application via the first radio bearer. Note that the application data may be unicast (e.g., as opposed to multicast or broadcast) data, at least in some instances.

Since the first radio bearer may utilize physical channels whose characteristics may be well suited to the application traffic pattern of the first application, network resource usage, device power consumption, and/or other system features may be improved relative to using one type of physical channel for all data communication. Furthermore, differentiating between traffic patterns and providing channels with characteristics optimized for specific traffic patterns may enable the development and use of specialized devices which only utilize applications (or a single application) with a specific type of traffic pattern.

For example, at least in some instances, certain machine type communication (MTC) may generally include periodic, low data rate communication. For devices which only need to perform such communication (e.g., process control devices, automation devices, measurement/monitoring devices such as thermometers, barometers, hydrometers, electricity meters, seismometers, etc.), device implementation may be simplified and power consumption may be reduced if the devices are not required to support higher power consumption techniques which are designed for high throughput and/or optimized for aperiodic/unscheduled communication.

As another example, while increasingly cellular phones are implemented with support for both voice and data services, by differentiating between multiple possible traffic patterns and providing physical channels with characteristics optimized for specific traffic patterns, it may also be possible to implement devices which support packet-switched voice communication such as VoLTE (and possibly applications with similar application traffic patterns) without supporting higher power consumption techniques which are designed for high throughput traffic and/or optimized for aperiodic/unscheduled communication. For example, VoLTE packets may typically have a relatively small, fixed payload (e.g., a transport block size of 328 bits may be sufficient in some instances), and may be exchanged at regular periodic intervals (e.g., 20 ms, in some instances). Devices which utilize just physical data channels with characteristics optimized for such types of application traffic might be relatively simple (and thus potentially inexpensive) to implement, and/or might have a reduced power consumption profile, and thus might appeal to users for whom expense and/or battery life are particularly important considerations.

Thus, it should be noted that in some instances, although the radio access technology with which the wireless device and the base station communicate may support multiple physical channels for either or both of uplink and downlink communication, it may be possible that the wireless device itself only supports one physical uplink and/or downlink channel.

However, if the wireless device does support multiple physical uplink and/or downlink channels, it may be the case that at some point the wireless device may have application traffic for which a different physical channel than that used by the first radio bearer may be most suitable. In such a case, in 708, the wireless device and the base station may establish a second data radio bearer.

Similar to establishing the first data radio bearer, establishing the second radio bearer may include selecting one or more physical channels (e.g., uplink and downlink) for the second radio bearer from among multiple possible physical channels. The physical channels for the second radio bearer may be selected based at least in part on an application traffic pattern of an application ("second application") associated with the second radio bearer. The physical channels selected for the second radio bearer may be different physical channels than those selected for the first radio bearer; for example, the application traffic pattern of the second application may be different than the application traffic pattern of the first application, on which basis different physical channels than those selected for the first radio bearer may be selected for the second radio bearer.

Once the second radio bearer has been established using the selected physical uplink and downlink channels, in 710, the wireless device and the base station may communicate (e.g., each may transmit and/or receive) application data associated with the second application via the second radio bearer. Note that, like the application data of the first application, the application data of the second application may also be unicast data, at least in some instances.

Note that, at least in some instances, if the application patterns of the first and second application were similar or the same, there might be no reason to establish a second radio bearer using a second set of physical channels for the second application if first radio bearer has already been established. For example, it may be possible in such a case to communicate application data associated with the second application via the first radio bearer in addition to communicating application data associated with the first application via the first radio bearer. Alternatively, if desired, a separate radio bearer may be established for each application actively exchanging application data via the cellular link between the wireless device and the base station.

FIGS. 8-16—Exemplary LTE Downlink and Uplink Channel Coding Procedure and Modifications to Support Additional Physical Channels While FIGS. 8-16 and the information provided with respect thereto are provided as being illustrative of various possible features of this disclosure, they are not intended to be limiting to the disclosure as a whole. Numerous alternatives to and variations of the following details are also possible and should be considered within the scope of the present disclosure.

Figure 8:
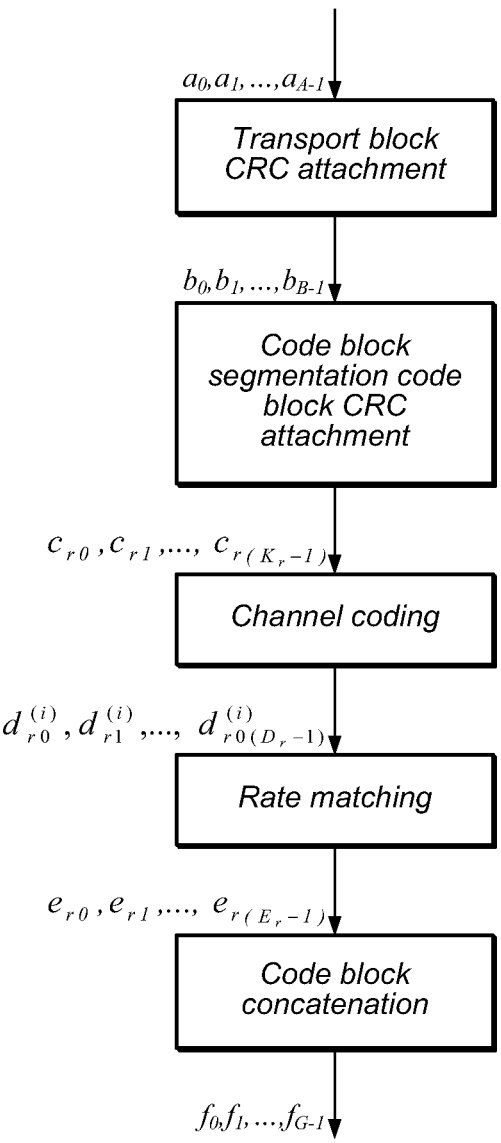
FIGS. 8-9 illustrate exemplary PDSCH and PUSCH data block processing procedures according to LTE.
Figure 9:
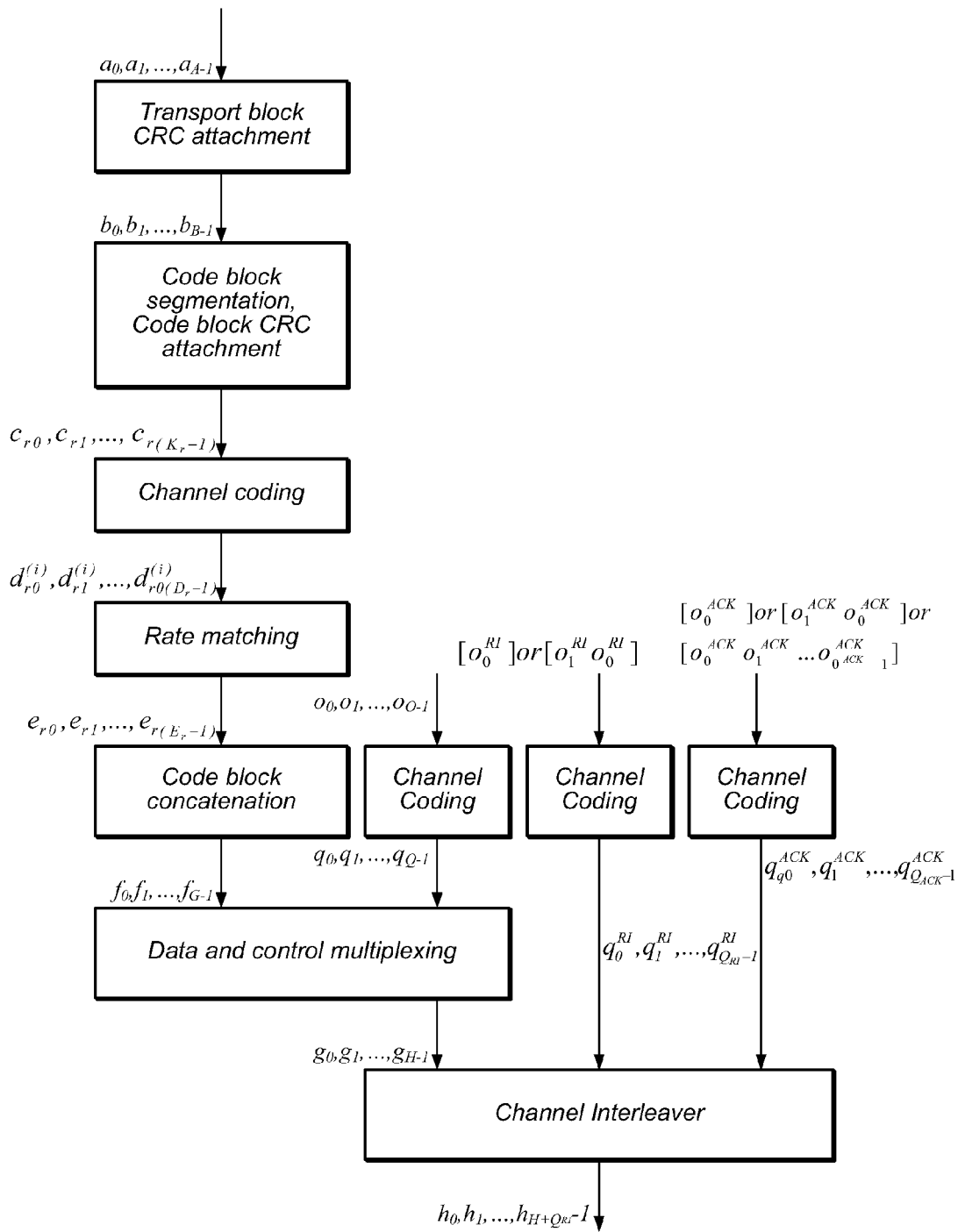

FIGS. 8-9 illustrate exemplary PDSCH and PUSCH data block processing procedures according to LTE.

As shown in FIG. 8, transport channel processing for the DL-SCH (which may be mapped to the PDSCH physical channel) may include transport block CRC attachment, code block segmentation and code block CRC attachment, channel coding, rate matching, and code block concatenation.

As shown in FIG. 9, transport channel processing for the UL-SCH (which may be mapped to the PUSCH physical channel) may include transport block CRC attachment, code block segmentation and code block CRC attachment, channel coding, rate matching, code block concatenation, data and control multiplexing, and channel interleaving.

As currently defined according to the 3GPP specification, the PDSCH and the PUSCH may each utilize turbo coding. As one possibility, alternate physical channels (which might be referred to as E-PDSCH and E-PUSCH) might be specified which each utilize convolutional coding. It should be noted that since LTE physical control channels (e.g., the PDCCH and PUCCH) may already utilize convolutional coding, providing physical data channels which also utilize convolutional coding may introduce little or no additional implementation complexity to devices configured to utilize current implementations of LTE.

Figure 10:
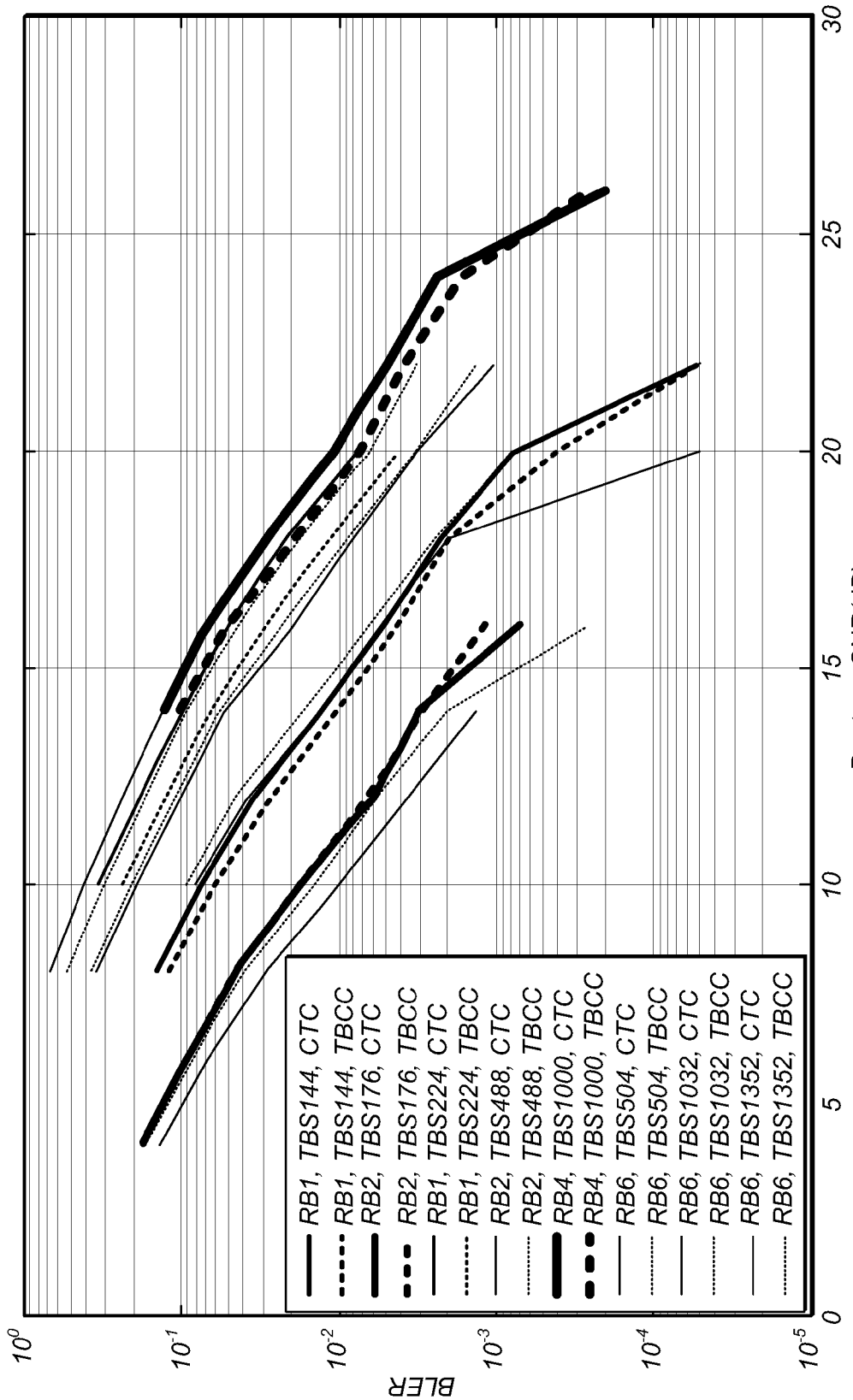
FIG. 10 is a graph illustrating an exemplary comparative performance test case of convolutional coding versus turbo coding.

FIG. 10 is a graph illustrating an exemplary comparative performance test case of convolutional coding versus turbo coding for a selection of relatively small transport block sizes (TBS), such as might be used by low data rate applications. As can be seen, the performance difference between concatenated turbo coding (CTC) and tailbiting convolutional coding (TBCC) for each of the transport block sizes in the illustrated scenario is relatively minimal. Thus, for relatively low data rate applications which may commonly be allocated such smaller TBSs, it may be possible to obtain the reduced power consumption and relatively simple implementation of convolutional coding with little or no performance trade-off relative to turbo coding by utilizing a physical data channel which uses convolutional coding instead of turbo coding.

FIGS. 11-16 illustrate possible protocol architectures and channel mappings which may be used to support multiple physical unicast data uplink and downlink channels. The downlink and uplink architectures (shown respectively in FIGS. 11-12) may include packet data convergence protocol (PDCP), radio link control (RLC), and media access control (MAC) layers. Radio bearers established at the PDCP layer may be mapped, with various functions performed at each intermediary layer, to logical channels, then to transport channels, and subsequently to physical channels.

Figure 11:
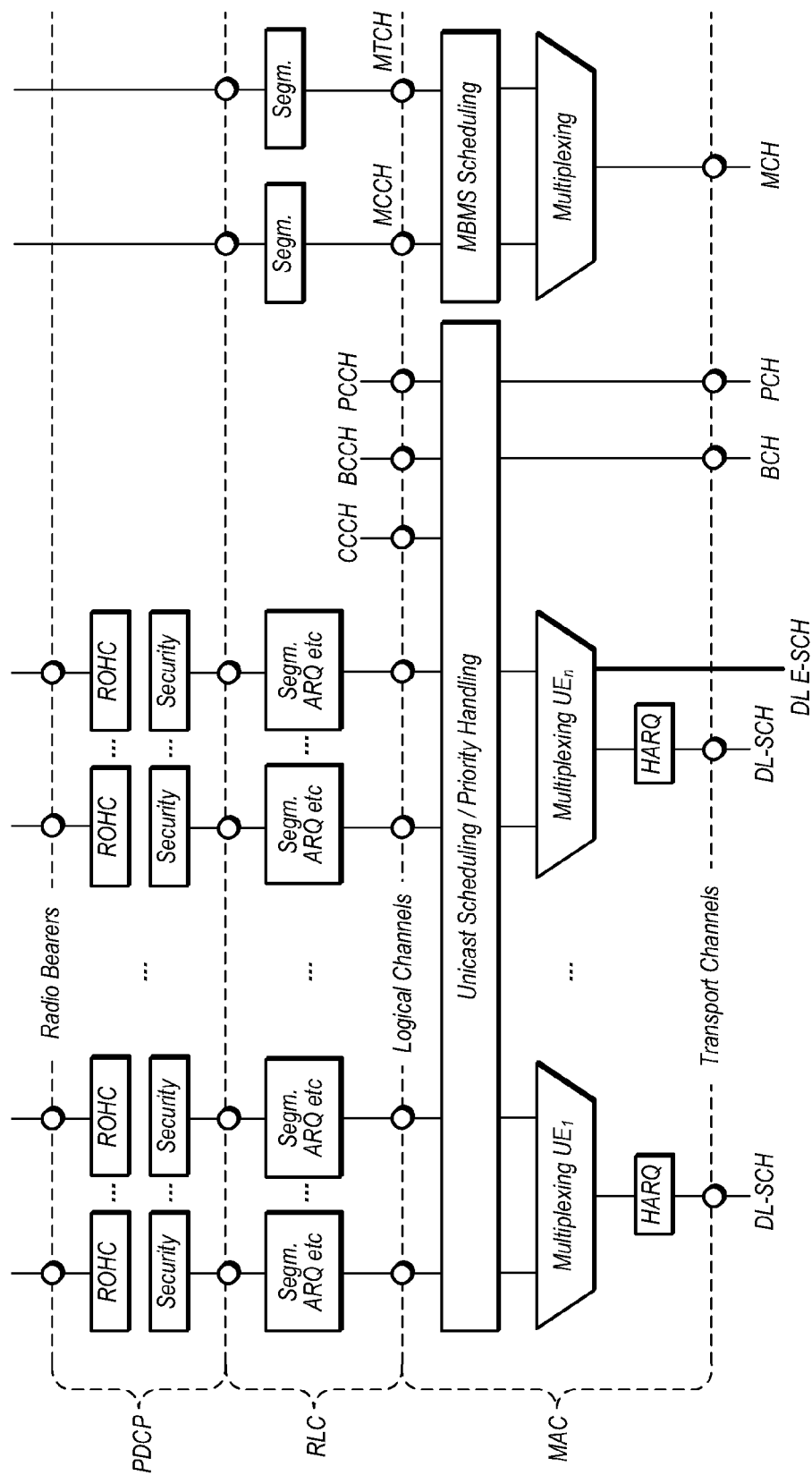
FIGS. 11-16 illustrate exemplary possible protocol architectures and channel mappings which may be used to support multiple physical unicast data uplink and downlink channels.
Figure 12:
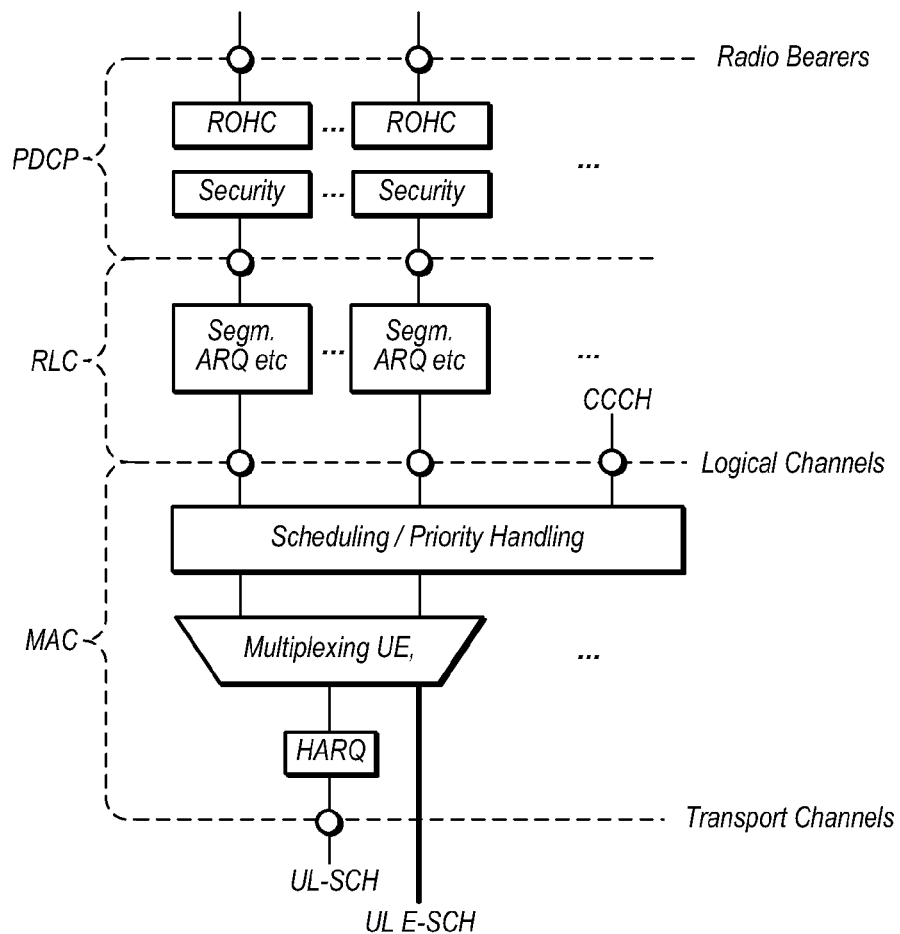

In particular, as shown in FIG. 11, both a DL-SCH and a DL E-SCH transport channel may be provided for at least one UE in the downlink, and as shown in FIG. 12, both a UL-SCH and a UL E-SCH may be provided in the uplink. As also shown, whereas hybrid automatic repeat request (HARQ) may be provided at the MAC layer for the DL-SCH and the UL-SCH, no HARQ may be provided for the DL E-SCH or the UL E-SCH. Though not shown, if desired, it may also be possible to forego ARQ (e.g., at the RLC level) for radio bearers which map to the DL E-SCH and the UL E-SCH. Other differences between channels (e.g., use of convolutional coding in DL E-SCH and UL E-SCH versus use of turbo coding in DL-SCH and UL-SCH, etc.) are also possible.

Figure 13:
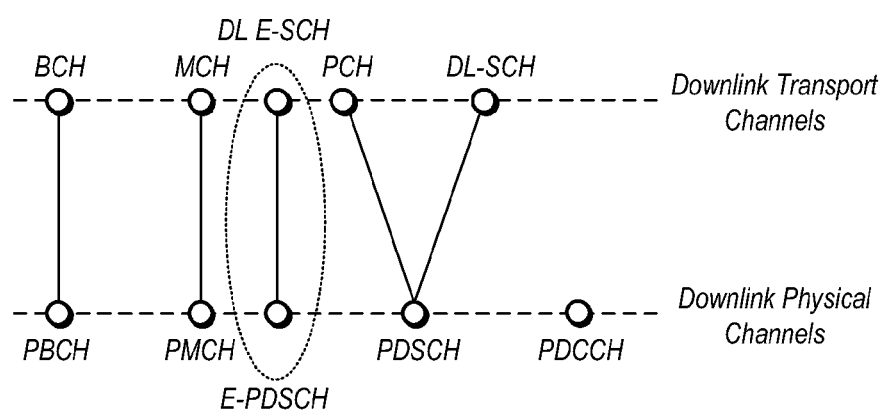

FIG. 13 illustrates possible downlink channel mappings from transport to physical channels such as might be used in conjunction with the architecture of FIG. 11. As shown, in addition to the BCH being mapped to the PBCH, the MCH being mapped to the PMCH, and the PCH and DL-SCH being mapped to the PDSCH, the DL E-SCH may be mapped to the E-PDSCH. The PDCCH may not map from a transport channel.

Figure 14:
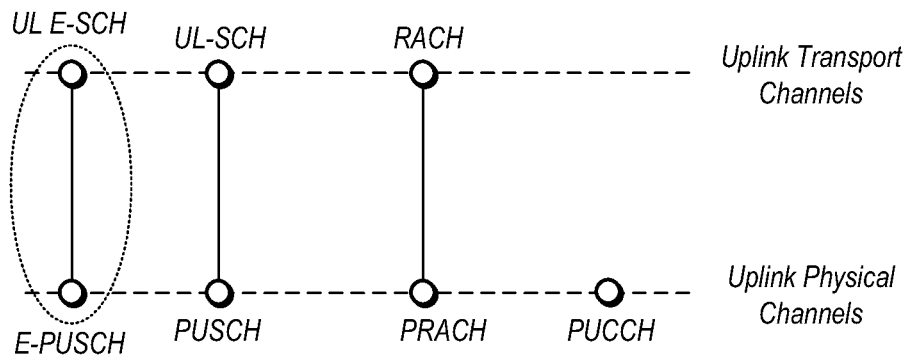

FIG. 14 illustrates possible uplink channel mappings from transport to physical channels such as might be used in conjunction with the architecture of FIG. 12. As shown, in addition to the UL-SCH being mapped to the PUSCH, and the RACH being mapped to the PRACH, the UL E-SCH may be mapped to the E-PUSCH. The PUCCH may not map from a transport channel.

Figure 15:
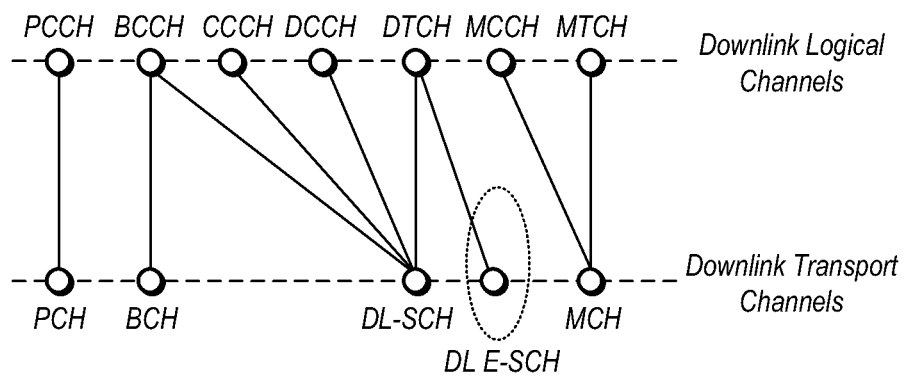

FIG. 15 illustrates possible downlink channel mappings from logical to transport channels such as might be used in conjunction with the architecture of FIG. 11. As shown, in addition to the PCCH being mapped to the PCH, the BCCH being mapped to the BCH and the DL-SCH, the CCCH, DCCH, and DTCH being mapped to the DL-SCH, and the MCCH and MTCH being mapped to the MCH, the DTCH may also be mapped to the DL E-SCH.

Figure 16:
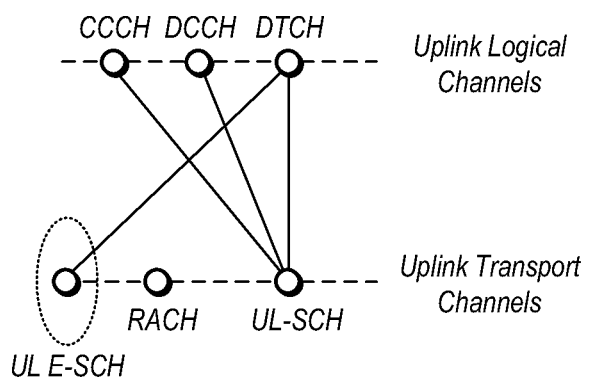

FIG. 16 illustrates possible uplink channel mappings from logical to transport channels such as might be used in conjunction with the architecture of FIG. 12. As shown, in addition to the CCCH, DCCH, and DTCH being mapped to the UL-SCH, the DTCH may also be mapped to the UL E-SCH. The RACH may not map from a logical channel.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a base station to perform wireless communication with a wireless device, the method comprising, by the base station:
  establishing a first radio bearer which utilizes a first physical downlink channel, wherein the first physical downlink channel uses convolutional coding and does not use hybrid automatic retry requests;
  selecting the first physical downlink channel for use with a first application based at least in part on an application traffic pattern of the first application;
  transmitting first unicast data to the wireless device on the first physical downlink channel, wherein the first unicast data comprises data for the first application;
  establishing a second radio bearer which utilizes a second physical downlink channel, wherein the second physical downlink channel uses turbo coding and does use hybrid automatic retry requests;
  selecting the second physical downlink channel for use with a second application based at least in part on an application traffic pattern of the second application;
  transmitting second unicast data to the wireless device on the second physical downlink channel, wherein the second unicast data comprises data for a second application, and wherein the application traffic pattern of the first application is different than the application traffic pattern of the second application.

2. The method of claim 1, the method further comprising:
  receiving first data associated with the first application from the wireless device on a first physical uplink channel; and
  receiving second data associated with the second application from the wireless device on a second physical uplink channel.

3. The method of claim 1,
  wherein the application traffic pattern of the first application comprises a periodic traffic pattern, wherein the application traffic pattern of the second application comprises an aperiodic traffic pattern.

4. The method of claim 1,
  wherein the application traffic pattern of the first application comprises a traffic data rate below a data rate threshold, wherein the application traffic pattern of the second application comprises traffic data rate above the data rate threshold.

5. A base station configured to perform wireless communication with a wireless device, the base station comprising:

a radio; and a processing element operatively coupled to the radio;

wherein the radio and the processing element are configured to:

establish a first radio bearer with the wireless device, wherein establishing the first radio bearer comprises selecting one or more physical channels for the first radio bearer of a plurality of possible physical channels, wherein the one or more physical channels for the first radio bearer are selected based at least in part on an application traffic pattern of a first application associated with the first radio bearer;

communicate application data associated with the first application with the wireless device via the first radio bearer;

establish a second radio bearer with the wireless device, wherein establishing the second radio bearer comprises selecting one or more physical channels for the second radio bearer of the plurality of possible physical channels, wherein the one or more physical channels for the second radio bearer are selected based at least in part on an application traffic pattern of a second application associated with the second radio bearer, wherein the one or more physical channels selected for the second radio bearer are different physical channels than the one or more physical channels selected for the first radio bearer; and communicate application data associated with the second application with the wireless device via the second radio bearer.

6. The base station of claim 5, wherein the plurality of possible physical channels comprise at least a first physical downlink channel and a second physical downlink channel, wherein the base station is further configured to:

select the first physical downlink channel for radio bearers associated with applications having a first application traffic pattern; and select the second physical downlink channel for radio bearers associated with applications having a second application traffic pattern.

7. The base station of claim 6, wherein the first application traffic pattern comprises periodic traffic having a data rate below a data rate threshold, wherein the second application traffic pattern comprises aperiodic traffic and/or traffic having a data rate above a data rate threshold.

8. The base station of claim 5, wherein the plurality of possible physical channels comprise at least a first physical uplink channel and a second physical uplink channel, wherein the base station is further configured to:

select the first physical uplink channel for radio bearers associated with applications having a first application traffic pattern; and select the second physical uplink channel for radio bearers associated with applications having a second application traffic pattern.

9. An apparatus configured to perform wireless communication with a wireless device, comprising:

a processing element operatively coupled to a radio, wherein the radio and the processing element are configured to:

establish a first radio bearer with the wireless device, wherein establishing the first radio bearer comprises selecting one or more physical channels for the first radio bearer of a plurality of possible physical channels, wherein the one or more physical channels for the first radio bearer are selected based at least in part on an application traffic pattern of a first application associated with the first radio bearer;

communicate application data associated with the first application with the wireless device via the first radio bearer;

establish a second radio bearer with the wireless device, wherein establishing the second radio bearer comprises selecting one or more physical channels for the second radio bearer of the plurality of possible physical channels, wherein the one or more physical channels for the second radio bearer are selected based at least in part on an application traffic pattern of a second application associated with the second radio bearer, wherein the one or more physical channels selected for the second radio bearer are different physical channels than the one or more physical channels selected for the first radio bearer; and communicate application data associated with the second application with the wireless device via the second radio bearer.

10. The apparatus of claim 9, wherein the plurality of possible physical channels comprise at least a first physical downlink channel and a second physical downlink channel, wherein the processing element is further configured to:

select the first physical downlink channel for radio bearers associated with applications having a first application traffic pattern; and select the second physical downlink channel for radio bearers associated with applications having a second application traffic pattern.

11. The apparatus of claim 10, wherein the first application traffic pattern comprises periodic traffic having a data rate below a data rate threshold, wherein the second application traffic pattern comprises aperiodic traffic and/or traffic having a data rate above a data rate threshold.

12. The apparatus of claim 9, wherein the plurality of possible physical channels comprise at least a first physical uplink channel and a second physical uplink channel, wherein the processing element is further configured to:

select the first physical uplink channel for radio bearers associated with applications having a first application traffic pattern; and select the second physical uplink channel for radio bearers associated with applications having a second application traffic pattern.

\* \* \* \* \*